3,575,856
FIBER LUBRICATING COMPOSITION AND METHOD
Anthony Anton, Wilmington, Del., assignor to E. I. du Pont de Nemours and Company, Wilmington, Del.
No Drawing. Filed July 6, 1967, Ser. No. 651,376
Int. Cl. D06m 13/26, 13/10
U.S. Cl. 252—8.9         3 Claims

ABSTRACT OF THE DISCLOSURE

An improved fiber lubricating composition containing coconut oil or an isocetyl ester of a 12 to 22 carbon atom fatty acid and a nonionic, surface-active condensate of ethylene oxide, the improvement of adding about 0.35% to 3.0% of potassium hydroxide to said lubricating composition.

---

Lubricating compositions for synthetic yarns are well known to the art. A suitable composition of the general type useful in the practice of this invention is disclosed in Coats U.S. Patent No. 3,248,258, dated Apr. 26, 1966. When yarns carrying such compositions are heated, they obtain improved physical properties for industrial uses. However, such compositions decompose on heated surfaces and form a resinous deposit which can interfere with yarn performance and require periodic cleaning to restore the rolls to their original condition.

The invention is an improved lubricating composition for synthetic yarns containing coconut oil or an isocetyl ester of a saturated fatty acid having 12 to 22 carbon atoms, a nonionic, surface-active condensate of ethylene oxide where the improvement is the addition of about 0.35% to about 3.0%, by weight, based on the weight of the composition of potassium hyroxide and about 0.5% to about 10% of water.

The ester is preferably isocetyl stearate. The coconut oil or isocetyl ester lubricant may consist of a relatively pure compound, or it may be a mixture of esters. The ester should be an oily liquid or be capable of being maintained in the liquid state. If a mixture of esters is used, the mixture should be essentially free of unsaturation.

The nonionic, surface-active condensate of ethylene oxide serves to improve the properties of the glyceryl ester, such as wetting action and static protection. These condensates also serve to improve the compatibility of the oily lubricating element and the aqueous potassium hydroxide. As is known, ethylene oxide condensates have hydrophilic properties due to the ethylene oxide moiety, and, when the other portion of the condensate is primarily hydrocarbon so as to provide a hydrophobic moiety, the condensate can be expected to exhibit surface-active properties. In general ethylene oxide condensates that are derivatives of compounds containing a chain of at least about 10 carbon atoms and at least 3 ethylene oxide units are useful in the practice of this invention. Preferably, the surface-active condensate will contain at least about 10 ethylene oxide units in its molecule since such compounds provide the composition with a high propensity for resisting the accumulation of a static charge in addition to improving the manner in which the composition can wet the filaments. These compounds have the further advantage of largely decomposing into volatile products. Preferred surface-active condensates are the condensates of ethylene oxide with the partial ester of fatty acids having at least 12 carbon atoms with polyols containing 3 to 6 hydroxyl groups and the products obtained by esterifying a condensate of ethylene oxide and a polyol having 3 to 6 hydroxyl groups with a fatty acid having 12 to 22 carbon atoms. These esterified products may be partial or complete esters and will preferably contain 20 to 50 ethylene oxide units in their molecules.

When coconut oil or the isocetyl esters are heated in an oxidative atmosphere, they degrade and form intermediate thermal decomposition products such as acids, aldehydes and ketones. These materials can condense through their carbonyl functions and lead to crosslinked products that become baked onto a heated surface as a hard, insoluble resin. It has been found that small amounts of potassium hydroxide can be added to the textile-lubricating composition to prevent the formation of hard, insoluble resins and, surprisingly, that caustic potassium compounds are unique in this respect. Other common hydroxides, e.g., ammonium and sodium hydroxide, are not suitable for the practice of this invention.

The potassium hydroxide can be used in its natural form or can be derived from a compound which will yield the necessary amount of potassium hydroxide when placed in water. It is well known that when potassium salts of weak acids are dissolved in water, they hydrolyze to form basic solutions. For example, when potassium carbonate is dissolved in water it hydrolyzes to yield potassium hydroxide. The addition of potassium hydroxide to textile-lubricating compositions in amounts of at least 0.35%, by weight, based on the weight of the composition, will reduce the amount of deposit formed and the deposit will be of such a nature that it can be wiped off of the heating surface using water as the solvent. At levels greater than about 3%, by weight, sedimentation can form and phase separation occur. Accordingly, the amount of potassium hydroxide suitable for use in this invention lies between about 0.35% and 3.0%, by weight, and preferably between 0.5% and 1.5%, by weight.

The potassium hydroxide, or its equivalent, is added as an aqueous solution primarily for the ease of handling, but also to insure that the caustic compound is dissolved in the composition. The compositions of this invention are usually preferred to be non-aqueous in nature; however, in some instances, it may be desirable to use the compositions in an aqueous system to improve process features such as threadline stability. This preference is due primarily to the additional heat load required to remove the water as the yarn is heated to a high draw temperature. Consequently, the water used is preferably kept to a minimum of 10% or less, by weight, of the composition. Ideally, the water content of the improved lubricating composition will be between about 2% and about 5%, by weight.

The preferred compositions suitable for use in the practice of this invention are homogeneous liquids. All components must be mutually compatible and not cause precipitation, gel formation or phase separation. The compositions will preferably be prepared by mixing 65 to 97 parts of lubricant with 3 to 35 parts of surface-active condensates of ethylene oxide and adding up to about 10%, by weight, based on the weight of the composition, of an aqueous solution containing 0.35% to about 3.0%, by weight, based on the weight of the composition, of potassium hydroxide.

Other materials may be added to the compositions provided they are soluble therein at the level added. As examples of suitable additives there may be mentioned biocides, antioxidants and the like. A preferred biocide is o-phenylphenol. The antioxidants may be the aryl amines, particularly the N-aryl derivatives of aryl amines, alkylene-bis-phenols and thio-bis-phenols as well as mixtures thereof and the like. As specific materials there may be mentioned a condensation product of diphenyl amine and acetone such as Aminox sold by Naugatuck Chemicals Co.; 4,4′-thio-bis(2-methyl-5-t-butyl phenol); 4,4′-butylidene-bis(3-methyl-6-t-butylphenol); and a polymer of 1,2-dihydro-2,2,4-trimethyl quinoline.

The lubricating compositions may be used with any continuous-filament yarn capable of being processed at a high temperature such as, for example, polyester and polyamide yarns. Suitable polyamides may be prepared from lactams such as caprolactam or from diamines and dibasic acids, or their amide-forming derivatives. As suitable dibasic acids, there may be mentioned adipic acid, dodecanedioic acid, isophthalic acid and terephthalic acid. Suitable diamines are m-xylylene diamine and hexamethylene diamine. The polyamides may be homopolymers or copolymers such as random or block co-polymers. If desired, melt blends may be used such as polyhexamethylene adipamide or polycaproamide containing dispersed polyethylene terephthalate.

The lubricating compositions are tested by placing 0.2 gram of the composition in an aluminum dish having a diameter of 6 centimeters and a depth of 1.5 centimeters. The dish is placed on a hot plate and weighted with a 40-gram crossbar. The sample is heated as required, and the amount and character of the residue is determined.

Reduction of the varnish will lead to a reduction of broken filaments during production of the yarns to which the finish of this invention is applied.

In the examples that follow, all parts are by weight and all percentages by weight based on the total weight.

EXAMPLE 1

This example illustrates the effectiveness of potassium hydroxide in reducing resin formation when compositions containing glyceryl esters are heated to high temperatures.

A solution of a lubricating composition is prepared by mixing, by weight, 68.2 parts of a refined coconut oil, 20 parts of a material prepared by condensing 1 mol of sorbitol with 30 mols of ethylene oxide and esterifying the condensate with 5 mols of a 4:1 mixture of oleic and lauric acids, 10 parts of a material prepared by condensing 1 mol of sorbitol with 40 mols of ethylene oxide and essentially completely esterifying the condensate with oleic acid and, as an antibacterial agent, 1.8 parts of o-phenylphenol.

To individual, 100-gram samples of the above lubricating composition are added 2.0-milliliter portions of distilled water containing, respectively, 0.0, 0.25, 0.35, 0.50 and 1.0 gram of potassium hydroxide. The 100-gram sample containing no aqueous potassium hydroxide is included for a control. The solutions are tested for 72 huors at 220° C. using the procedure described above. The results are shown in Table 1.

TABLE 1

| Grams of KOH/100 grams of composition | Grams of residue | Nature of residue |
| --- | --- | --- |
| 0 (control) | 10.3 | Hard solid, insoluble in cold water. |
| 0.25 | 4.0 | Hard solid, slightly soluble in cold water. |
| 0.35 | 2.9 | Paste, slightly soluble in cold water. |
| 0.50 | 2.1 | Paste, soluble in cold water. |
| 1.0 | 2.6 | Do. |

The hard solid residue cannot be removed by cold water, but the paste is readily removed. Thus, it can be seen that amounts of potassium hydroxide between about 0.35% and 1.0% reduce the amount of residue and change its nature so that it can be readily removed.

EXAMPLE 2

This example illustrates the effectiveness of potassium hydroxide in comparison with other common hydroxides in the practice of this invention.

To individual, 100-gram samples of the lubricating composition of Example 1 is added 2.0-milliliter portions of aqueous solutions of ammonium hydroxide, lithium hydroxide, sodium hydroxide and potassium hydroxide. All of the resulting solutions contain 1.0% hydroxide. A similar sample containing no hydroxide is used as a control. The samples are heated at 225° C. for 192 hours using the procedure described above. The results are shown in Table 2.

TABLE 2

| Hydroxide | Gel formed | Percent of sample remaining as a residue | Nature of residue |
| --- | --- | --- | --- |
| None | No | 6.5 | Hard solid, insoluble in cold water. |
| NH₄OH | No | 6.0 | Do. |
| LiOH | Yes | 4.4 | Paste, partially soluble in cold water. |
| NaOH | Yes | 2.8 | Do |
| KOH | No | 0.5 | Do. |

From these results it can be seen that, of the hydroxides tested, only potassium hydroxide is suitable for the practice of this invention.

EXAMPLE 3

This example illustrates the practice of this invention in the drawing of polyamide yarn on heated draw rolls.

A 140-filament, 66 nylon (polyhexamethylene adipamide) yarn is spun in a conventional manner and is passed across the face of a roll rotating through a bath of the lubricating composition of Example 1 containing 2% of water and 1% potassium hydroxide. The yarn picks up about 1.8% of the lubricating composition. The yarn is then drawn to a denier of 822 in a process where it contacts a pair of draw rolls heated to a temperature of 220° C. The yarn travels at about 2650 meters per minute and the process can be run continually for more than 15 days. After 15 days, the deposit is readily removed from the rolls by wiping them using cold water. The deposit does not interfere with the production of a high quality yarn and only 0.86 quality break bobbins are obtained for each 454 kilograms of yarn produced during the 15-day run.

When the lubricating composition of Example 1 is used without the potassium hydroxide, the process is operated for only about 8 days. After installation of new rolls, the process is operated for an additional 7 days. Removal of the deposit formed on the rolls requires the use of steam and a highly alkaline, paste-type cleanser. During the 15-day period there are produced 3.86 quality break bobbins for each 454 kilograms of yarn produced. The 3.86 break level is exceedingly high and if it were to be reduced to an acceptable level of about 1.0 to 1.5 quality break bobbins per 454 kilograms of yarn, the process would have to be interrupted and clean rolls installed at a frequency of 3 times per week.

EXAMPLE 4

This example illustrates the use of potassium hydroxide in an alternate composition.

A solution of a lubricating composition is prepared by mixing 95 parts of a refined coconut oil and 5 parts of a material prepared by condensing 1 mol of sorbitol with 30 mols of ethylene oxide and esterifying the condensate with 5 mols of a 4:1 mixture of oleic and lauric acids. This composition is then modified so as to contain 1% potassium hydroxide and 2% water. The modified composition is tested as described above for 48 hours at 225° C. and 7% remains as a water-soluble residue. A control composition is tested under the same conditions and 11% remains as a water-insoluble resin.

EXAMPLE 5

An emulsion is prepared by adding 10 parts of a lubricating composition to 90 parts of water. The lubricating composition consists of 72.5 parts of isocetylstearate, 12.5 parts of glyceryl stearate (a material containing about 60% of glycerylmonooleate) 12.5 parts of the oleate laurate ester of Example 1 and 12.5 parts of sodium di(2-ethylhexyl)sulfosuccinate.

The above prepared 10% emulsion is made alkaline by the addition of a 45% potassium hydroxide solution so as to provide 1.0% of potassium hydroxide based on the weight of lubricating composition. The emulsion is then applied to a 66 nylon yarn. The yarn has a denier of 199 and contains 34 filaments. The yarn is drawn to a denier of 70 by passing it from a pair of feed rolls to a pair of draw rolls rotating at 2910 yards per minute. The draw rolls are heated to a temperature of 190° C. and the yarn has a residence time on the rolls of 0.05 second. The yarn contains 2.23% of the lubricating composition. The process is run for 5 days with no deposit being formed on the hot rolls.

Under similar conditions using the above-identified lubricating composition to which no potassium hydroxide has been added a film is deposited on the rolls within 36 hours and the occurrence of broken filaments in the draw yarn increases significantly.

What is claimed is:

1. A textile fiber lubricating composition consisting essentially of
   (a) about 65 to 97 parts by weight of coconut oil or an isocetyl ester of a 12 to 22 carbon atom saturated fatty acid,
   (b) about 3 to 35 parts by weight of an ester of a 12 to 22 carbon atom fatty acid with an ethoxylated polyol containing from 3 to 6 hydroxyl groups, said ethoxylated polyol ester having from at least about 10 to 50 ethylene oxide units, and
   (c) about 0.5% to 10% water and about 0.35% to 3.0% potassium hydroxide based on the weight of (a) and (b).

2. The textile fiber lubricating composition of claim 1 wherein (a) is isocetyl stearate.

3. The textile fiber lubricating composition of claim 1 wherein the potassium hydroxide is present in the amount of about 0.5% to 1.5% by weight.

References Cited

UNITED STATES PATENTS

| | | | |
|---|---|---|---|
| 2,008,419 | 7/1935 | Herman | 252—8.6 |
| 2,207,256 | 7/1940 | Kapp | 252—8.6X |
| 2,285,357 | 6/1942 | Robinson | 252—8.6 |
| 3,248,258 | 4/1966 | Coats | 117—139.5X |
| 3,421,935 | 1/1969 | Finch | 252—8.9X |

HERBERT B. GUYNN, Primary Examiner

U.S. Cl. X.R.

117—138.8, 139.5; 252—8.6